(12) United States Patent  
Carbonell et al.

(10) Patent No.: US 9,355,310 B2
(45) Date of Patent: May 31, 2016

(54) MONITORING INDIVIDUALS USING DISTRIBUTED DATA SOURCES

(71) Applicant: International Business Machines Corporation, Armonk, NY (US)

(72) Inventors: Lee A. Carbonell, Flower Mound, TX (US); Tsz S. Cheng, Grand Prairie, TX (US); Jeffrey L. Edgington, Keller, TX (US); Pandian Mariadoss, Allen, TX (US)

(73) Assignee: International Business Machines Corporation, Armonk, NY (US)

(*) Notice: Subject to any disclaimer, the term of this patent is extended or adjusted under 35 U.S.C. 154(b) by 59 days.

(21) Appl. No.: 14/287,317

(22) Filed: May 27, 2014

(65) Prior Publication Data

US 2015/0347829 A1 Dec. 3, 2015

(51) Int. Cl.
*G06K 9/00* (2006.01)

(52) U.S. Cl.
CPC ........ *G06K 9/00369* (2013.01); *G06K 9/00288* (2013.01); *G06K 9/00771* (2013.01)

(58) Field of Classification Search
CPC ...................................................... G06K 9/00
USPC ......................................................... 382/103
See application file for complete search history.

(56) References Cited

U.S. PATENT DOCUMENTS

| | | | | |
|---|---|---|---|---|
| 8,284,255 | B2 | 10/2012 | Yokomitsu | |
| 8,564,667 | B2* | 10/2013 | Yun | G01S 3/7865 348/143 |
| 2005/0258238 | A1* | 11/2005 | Chapman | G06K 19/07381 235/380 |
| 2006/0222211 | A1* | 10/2006 | Olivo | G06K 9/00979 382/115 |
| 2013/0222599 | A1 | 8/2013 | Shaw | |
| 2013/0223696 | A1* | 8/2013 | Azar | G06K 9/00892 382/118 |

* cited by examiner

*Primary Examiner* — Stephen R Koziol
*Assistant Examiner* — Delomia L Gilliard
(74) *Attorney, Agent, or Firm* — Isaac J. Gooshaw

(57) ABSTRACT

One or more processors receive data from one or more devices including an image of an individual and information that indicates the identity of the individual. One or both of the image and the information include data that indicates a location. One or more processors analyze the image of an individual and the information to generate a set of identifying characteristics for the individual. Based on a result of the analysis, one or more processors determine whether the set of identifying characteristics of the individual matches a recorded set of identifying characteristics of that individual within a threshold. In response to a determination that there is a match within the threshold, one or more processors associate the location with the individual.

20 Claims, 3 Drawing Sheets

US 9,355,310 B2

MONITORING INDIVIDUALS USING DISTRIBUTED DATA SOURCES

BACKGROUND OF THE INVENTION

The present invention relates generally to the field of security, and more particularly to verifying the location of an individual.

In some scenarios, with an increase in population density and in publically available transportation, such as buses, trains and taxi services, there is a proportionate increase in the number of individuals that are mobile within a given metropolitan area. Further, as metropolitan areas grow, there is an ever increasing number of venues and locations of interest that become available to those individuals, such as, for example, skateboard parks and shopping malls.

In other scenarios, there may be a small population that is spread out over a larger area. However, in that scenario there may be a far greater number of locations of interest that become available to those individuals. For example, areas that offer a great vantage point for nature watching.

SUMMARY

Embodiments of the present invention provide a method, system, and program product for determining a location of an individual. One or more processors receive data from one or more devices that are configured to gather at least one image of an individual and at least one information that indicates the identity of the individual. One or both of the at least one image and the at least one information include data that indicates a location. One or more processors analyze the at least one image of an individual and the at least one information to generate a first set of identifying characteristics of the individual. One or more processors determine whether the first set of identifying characteristics of the individual matches a second set of identifying characteristics of that individual, within a threshold. The second set of identifying characteristics of that individual are of record. In response to a determination that the first set of identifying characteristics matches the second set of identifying characteristics within the threshold, one or more processors associate the location with the individual.

DETAILED DESCRIPTION

Figure 1:
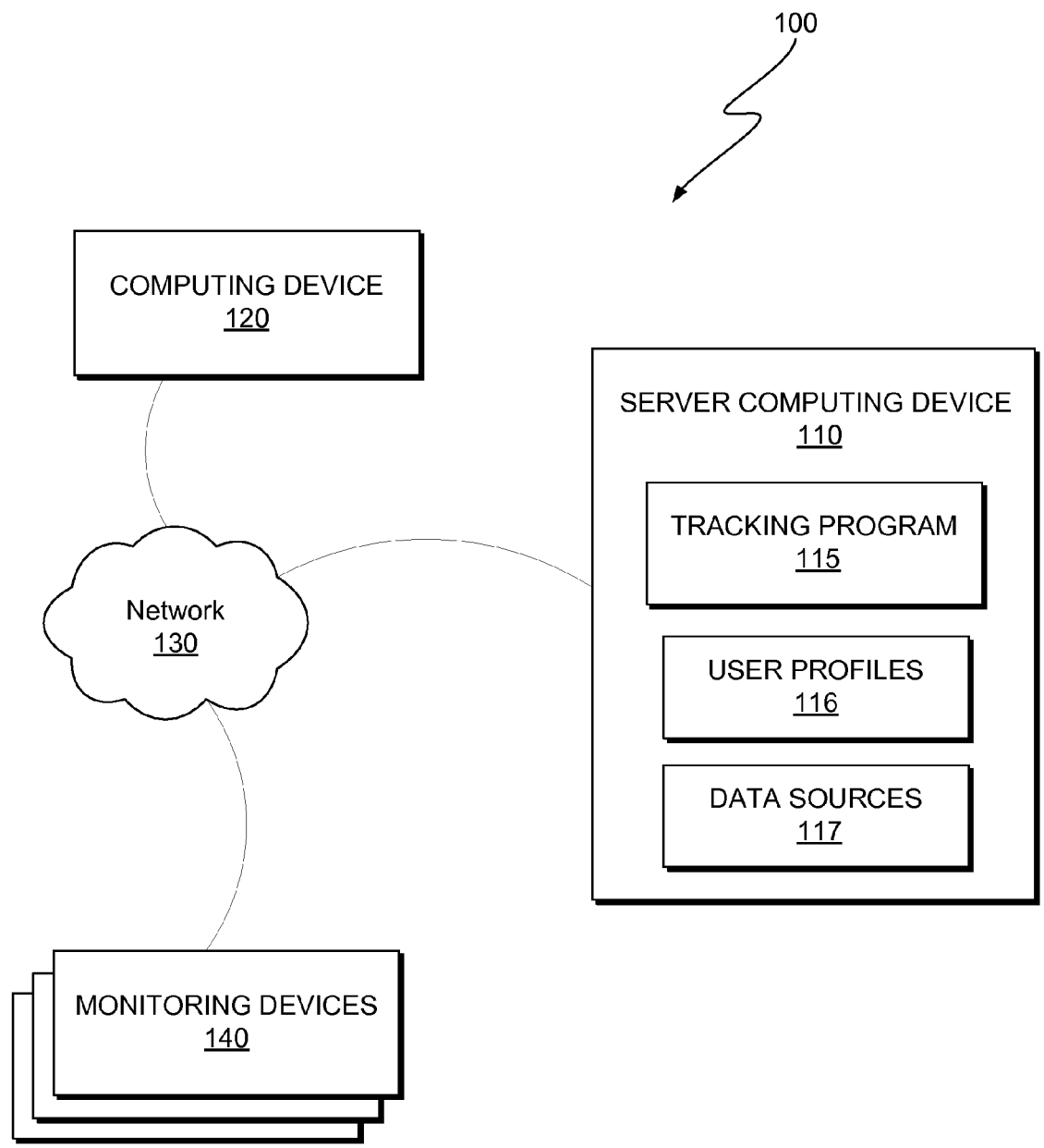
FIG. 1 is a functional block diagram illustrating a metropolitan information technology (IT) environment, in accordance with an embodiment of the present invention.

The safety and whereabouts of certain individuals is often a top concern among many authority figures. There are many situations where an individual is outside of a home without being with an authority figure. For example, walking or taking a bus to/from school or library, going to shopping malls or movie theatres with friends, etc. In certain known solutions, in order to monitor the whereabouts of an individual, the authority figure provides a GPS-enabled mobile phone to the individual to carry and subscribes to monitoring service provided by a wireless carrier.

However, due to financial or other reasons, this option may not be viable to many authority figures. As such, in other known solutions, there are programs (which are sometimes free to authority figures and/or mandated by schools) for tracking certain individuals. For example, some schools track their students with radio frequency identification (RFID) tags while the students are on campus. Such a program could certainly notify authority figures when an individual, under their care, enters or leaves school. However, once such an individual is outside of the school, the school and the authority figures lose the ability to monitor the individual since the RFID tags cannot be detected by the sensors located at the school, which have limited sensing range. In addition, with such programs, there are often privacy concerns for the individual since in some cases the authority figures and the individual may not have the choice to opt-out such programs.

While known solution to track the location of an individual are known they have inherent limitations due to their implementation. Some require an individual to carry a traceable device, such as an RFID tag or global positioning system (GPS) device. Others are only capable of tracking or tracing the location of an individual within a very limited area, such as a building or its surrounding property.

An embodiment of the present invention recognizes that it is difficult to track the whereabouts an individual if that individual is in an environment that is not specifically configured for such tracking, such as a shopping mall. An embodiment of the present invention recognizes that it is often difficult to have individuals carry a traceable device. An embodiment of the present invention recognizes that privacy concerns for an individual may discourage the use of tracking systems by some authority figures. An embodiment of the present invention provides multiple sources of information that are used to determine the location of a given individual. An embodiment of the present invention provides authority figures with the option of selecting which types of data sources are used for tracking purposes. An embodiment of the present invention provides tracking of individuals without the required use of traceable device that must be carried by the individual. An embodiment of the present invention provides verifiable tracking of specific individuals. An embodiment of the present invention provides incentives to encourage individuals to provide data that is used to verify their location.

The present invention will now be described in detail with reference to the Figures.

FIG. 1 is a functional block diagram illustrating a metropolitan information technology (IT) environment, generally designated 100, in accordance with an embodiment of the present invention. Metropolitan IT environment 100 includes server computing device 110, computing device 120 and monitoring devices 140 connected over network 130. Server computing device 110 includes tracking program 115, user profiles 116 and data sources 117. In general, in the illustrative embodiments described herein, metropolitan IT environment 100 represents a city with a large human population and has the IT infrastructure, e.g., software, computers and telecommunications equipment, to store, retrieve, transmit and manipulate data as required by tracking program 115. In the illustrative embodiments described herein, such data is gathered by monitoring devices 140 and is stored as part of data sources 117.

In various embodiments, server computing device 110 is a computing device that can be a standalone device, a server, a laptop computer, a tablet computer, a netbook computer, a personal computer (PC), or a desktop computer. In another embodiment, server computing device 110 represents a computing system utilizing clustered computers and components to act as a single pool of seamless resources. In general, server computing device 110 can be any computing device or a combination of devices with access to tracking program 115, user profiles 116 and data sources 117 and is capable of executing tracking program 115. Server computing device 110 may include internal and external hardware components, as depicted and described in further detail with respect to FIG. 3.

In various embodiments, computing device 120 is a computing device that can be a smartphone, a laptop computer, a tablet computer, a netbook computer, a personal computer (PC), or a desktop computer that is connected to network 130. In another embodiment, computing device 120 represents a computing system utilizing clustered computers and components to act as a single pool of seamless resources. In certain embodiments, computing device 120 is configured to update user profiles 116 in response to input from a user. Computing device 120 may include internal and external hardware components, as depicted and described in further detail with respect to FIG. 3, in accordance with various embodiments.

In various embodiments, monitoring devices 140 are devices, or combinations of devices, that are configured to gather data and to store that data as part of data sources 117. In some embodiments, monitoring devices 140 include, for example, video recording devices, audio receiving devices, keypads for key-code entry, bar code scanners, magnetic strip scanners, RFID tag scanners, and biometric scanners, such as finger print and retinal pattern scanners. In general, monitoring devices 140 include any device or combination of devices that are connected to network 130, which are capable of gathering information required by tracking program 115 and are able to include that data as part of data sources 117, as explained in further detail below. It is to be noted that in certain embodiments, monitoring devices 140 may include internal and external hardware components, as depicted and described in further detail with respect to FIG. 3.

In an embodiment, tracking program 115, user profiles 116 and data sources 117 are stored on server computing device 110. However, in other embodiments, tracking program 115, user profiles 116 and data sources 117 may be stored externally to server computing device 110 and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between server computing device 110, computing device 120, tracking program 115, user profiles 116 and data sources 117, in accordance with an embodiment.

In an embodiment, tracking program 115 determines the location of an individual by monitoring specific types of data streaming from a variety of data sources, such as those included in data sources 117. In various embodiments, tracking program 115 identifies individuals, at least in part, by applying facial recognition techniques to video data received from data sources 117, e.g., by analyzing facial features using facial recognition software. In some cases, the location of the device that captured the video data is known to tracking program 115. As such, identification of the individual in that video data allows tracking program 115 to determine the location of the individual. In other cases, tracking program 115 analyzes objects, sounds and characters included in the video data to locate the individual. For example, analysis of the video data indicates the sound of a train passing by along with lettering that reads "XYZ". In this example, the user profile includes the names and addresses of the friends of the individual along with a known range of travel of the individual. Tracking program 115 searches the internet for train tracks, the words "XYZ" and the known range of travel of the individual. Tracking program 115 applies statistical analysis to the results of the search and determines that the individual is most likely at the house of their friend BB.

In some embodiments, tracking program 115 also determines the location of an individual based on a code entry at a keypad. In such scenarios, the location of the keypad is known to or is determinable by tracking program 115. As such, the location of the individual is implied via the entry of the code using the keypad and tracking program 115 logs the location of the individual to coincide with that of the keypad. In some embodiments, tracking program 115 also determines the location of an individual based on an RFID reader that scans a card or RFID-enabled key chain. In some embodiments, tracking program 115 also determines the location of an individual based on the determined presence of a particular cell phone or another like portable computing device such as a laptop. In some embodiments, tracking program 115 also determines the location of an individual based on a barcode scanner that scans a keychain. In some embodiments, tracking program 115 also determines the location of an individual based on a type of biometric identification, such as a fingerprint taken using a fingerprint reader. In short, tracking program 115 identifies individuals based on facial recognition techniques and can, depending on the embodiment and type of information available, further verify that identification using any of a number of other techniques, such as those described above.

In an embodiment, tracking program 115 provides a variety of incentives to encourage individuals to provide data that is used, by tracking program 115, to determine their location. For example, an individual scanning a barcoded keychain, using a barcode scanner in a school lunchroom, adds desert money to a lunch account of that individual. In another example, providing a thumbprint and retinal scan at a scanning device in a shopping mall adds money to the account of the individual. In another example, a user verifying their identity by entering a key-code at a movie ticket kiosk allows them to watch a movie at a movie theatre by printing tickets for the movie. The type of incentive offered by tracking program 115 for data that verifies the location of an individual can vary from one embodiment to another.

In an embodiment, tracking program 115 regularly updates the records included in user profiles 116 with the determined locations of various individuals and the data related to the determinations of those locations. In certain embodiments, such updates are made based on a scheduled. In other embodiments, such updates are made in response to a determined location of an individual. For example, an individual is determined to be at a shopping mall when they are scheduled to be in school.

In an embodiment, user profiles 116 includes profile information for users that are registered with tracking program 115. User profiles 116 also includes a set of reference characteristics and records for the individual being tracked by tracking program 115. In some embodiments, such characteristics include biometric data such as fingerprints, retinal patterns, facial features, and a stature and build of the individual. In some embodiments, such records include known social and behavioral patterns of the individual such as associates that are often visited by the individual, common routes used by the individual, and a range of travel typically associated with the individual. In some embodiments, user profiles 116 includes account information for the individual being tracked by tracking program 115 and for the authority figure that initiated the tracking. This information is used by tracking program 115 to provide incentives to the individual to provide information; described in further detail in the discussion of FIG. 2. For each user profile, user profiles 116 includes records that shows the determined locations of the individual being tracked by tracking program 115, as dictated by the respective user profile. Such locations are generated when tracking program 115 identifies an individual and correlates that identification with a specific location. In some embodiments, such records include audio data, video data or another form of multimedia data that was used to determine the location of the individual being tracked by tracking program 115. For each user profile, user profiles 116 includes profile data that is relevant to an individual that is to be monitored by tracking program 115. For example, such data can include the name, age and gender of the individual to be monitored as well as notification preferences, contact information for the authority figure of the individual, and a list of emergency contacts for the individual.

User profiles 116 also includes a number of preset rules that can be applied when tracking individuals. For example, the preset rules dictate the checkpoints to be used for identification of the individual and the expected schedule for that individual. In another example, the preset rules dictate method(s) of identification (e.g. Unique code, RFID, cell phone, Bluetooth, etc.) that are to be employed when identifying the individual. In some embodiments, certain preset rules are configured to be customizable by users that are registered with tracking program 115. In certain embodiments, such customized rules are saved as part of the user profile that is associated with a respective user that created the customized rules. For example, a configurable rule includes exceptions for various criteria and preset rules that are to be applied when the individual is on vacation or at home sick.

The profile data included in user profiles 116 also includes a number of configurable settings that collectively indicate to tracking program 115 which tracking rules are to be applied to determine a location of an individual and what sources of information are to be used for that determination. For example, a rule specifies that every three hours tracking program 115 is to determine the location of individual A based on facial recognition and voice recognition methods that are to be applied to video and audio surveillance data from a shopping mall, which is included as part of data sources 117.

In an embodiment, data sources 117 is a large body of data, i.e., sources of information, that is accessed by tracking program 115 to determine the location of individuals as indicated by the settings included of a user profile included in user profiles 116. For example, data sources 117 includes audio and video data from school bus surveillance equipment. In another example, data sources 117 includes scanned barcode data from a keychain reader located at the entrance to an outlet store at a shopping mall.

Figure 2:
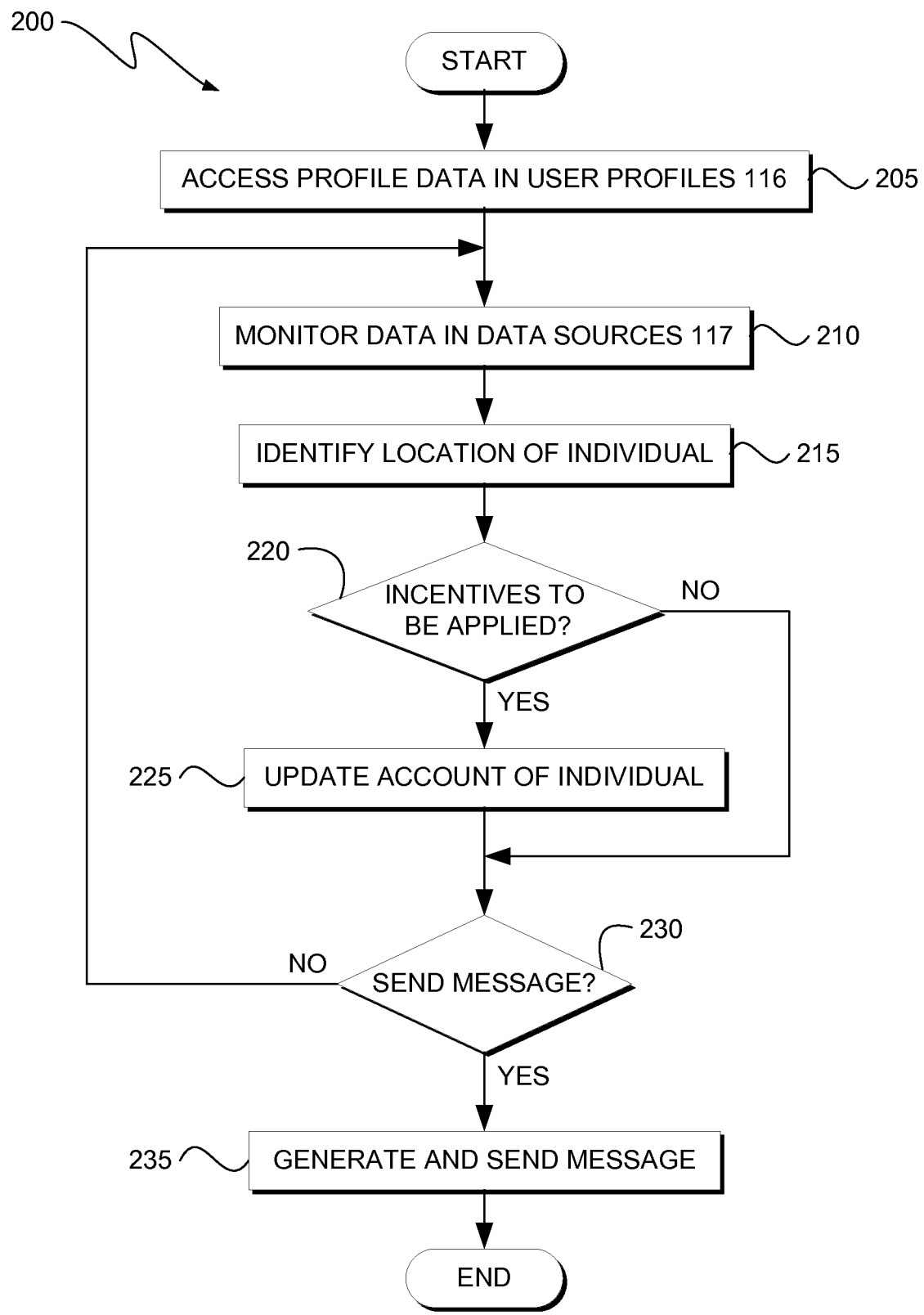
FIG. 2 illustrates a flowchart of operational processes of a tracking program, executing on a computing device within the environment of FIG. 1, in accordance with an embodiment of the present invention.

FIG. 2 illustrates a flowchart, 200, of operational processes of a tracking program 115, executing on a computing device within the environment of FIG. 1, in accordance with an embodiment of the present invention.

In process 205, tracking program 115 accesses the profile data, included in user profiles 116. Tracking program 115 identifies which individuals are to be monitored and what sources of data, included in data sources 117, are to be used for that monitoring; based on the information included in the respective user profiles. In the following example, an authority figure of an individual wishes to confirm that the individual safely arrived and left the premises of a school and did not leave the school premises during school hours. As such, when tracking program 115 accesses the profile data, included in user profiles 116, tracking program 115 identifies profile data indicating the identity of the individual, hereafter referred to as "individual A", as well as the preset and customized rules to be applied when identifying individual A. In this case, customized rules specify specific time periods in which individual A is to be monitored, namely the time periods in which individual A is traveling to and from school, and the time period in which individual A is supposed to be in school. In some embodiments, tracking program 115 monitors a group of individuals. For example, tracking program 115 is scheduled to monitor a group of individuals boarding a school bus.

In process 210, tracking program 115 begins monitoring the data included in data sources 117 for information that tracking program 115 is to use to identify individuals, according to the preset and customized rules, in user profiles 116 that are being applied. Continuing with the previous example regarding individual A, when the bus returns to the bus garage, tracking program 115 receives a transmission from a video camera on the bus. The video camera in this example is configured to upload captured video footage whenever the bus returns to the bus garage. As such, at least two segments of video footage are uploaded to data sources 117 during typical operation of the school bus. The first segment shows which individuals boarded the bus to travel to the school. The second segment shows which individuals boarded the bus to leave the school.

The school also has a motion activated video recording system installed in the hallways, which uploads captured video to data sources 117 whenever video is recorded. In addition, individual A carries an identification card with him/her. This card is used by individual A at a kiosk in the school lunch room. The kiosk includes a keypad, a microphone, a thermal video camera and a fingerprint scanner, which individual A has to activate in order to have funds transferred to their school lunch account. As such, to purchase lunch and a desert individual A activates the kiosk by sliding the identification card through a slot configured to read the card. The kiosk reads the identification card and prompts individual A to place their thumb on the finger print reader, to enter a password via the keypad, speak a password into the microphone and to look into an opening to provide a retinal scan. Meanwhile, the kiosk has taken multiple thermal images of the face of individual A.

In process 215, tracking program 115 identifies the location of the individual based on the information retrieved from data sources 117. In continuation with the previous example regarding individual A, throughout the school day, tracking program 115 receives the following: the first and second segments of video footage from the bus when the bus returns to the bus garage, fourteen video clips taken by the motion activated video recording system, information indicating the activation of the kiosk using the identification card along with the thumb print, entered password, spoken password, retinal scan and thermal images. As this information is identified by tracking system 115, tracking system 115 applies a number of recognition techniques to verify the identity of individual A. These techniques include facial recognition techniques that are applied to the first and second segments of video footage from the bus, the fourteen video clips and the thermal images captured by the kiosk.

As a result of the application of the aforementioned recognition techniques, tracking program 115 matches the various instances of the face of individual A, which was identified from the bus video footage, fourteen video clips, and the thermal images, to stored images of individual A that are included as part of user profiles 116. In addition, tracking program 115 uses voice recognition techniques to analyze the spoken password, and matches the voice pattern to a pattern of individual A, which is included as part of user profiles 116. Tracking program 115 also matches the entered password, thumbprint and retinal scan to a password, thumbprint and retinal scan of individual A, as which are included as part of user profiles 116. Based on the results of the facial recognition and other recognition techniques as described above, tracking program 115 identifies individual A at each of the respective locations, which are indicated by the various data retrieved from data sources 117. In this embodiment, tracking program 115 determines whether a match exists based on whether there is a match within a specified threshold. For example, a match in voice pattern that is within 95% of a perfect match. As such, as the day progresses and the various data is retrieved from data sources 117, tracking program 115 creates a number of entries that correspond to each location, which indicate that individual A was identified at that location, and saves those entries as part of user profiles 116. In some embodiments, a time stamp is included in such entries to indicate the time at which individual A was identified at a particular location.

In decision process 220, tracking program 115 determines whether incentives are to be applied in response to the identification of an individual at a particular location. In general, in this embodiment, the application of incentives in response to the identification of an individual at a particular location involves the transfer or release of funds for use by the individual. As such, multiple forms of identification are required in order to initiate such an application. In continuation with the previous example regarding individual A, the preset and customized rules indicate that a positive identification of individual A in the lunchroom, via the kiosk, is to result in a once a day transfer of funds from an account of the authority figure to the school lunch account of individual A. As such, as a result of the positive identification of individual A via the kiosk using multiple forms of verification; tracking program 115 determines that incentives are to be applied in response to the identification of individual A at the lunch room. In this embodiment, if tracking program 115 determines that incentives are to be applied in response to the identification of an individual at a particular location, then tracking program 115 proceeds to update the account of the individual, in process 225. In this embodiment, tracking program 115 updates the account of the individual by transferring lunch money, or another form of compensation, from the account of the authority figure to the account of the individual. In other embodiments, the method used by tracking program 115 to provide incentives varies, and would be understood by one skilled in the art. In this embodiment, if tracking program 115 determines that incentives are not to be applied in response to the identification of an individual at a particular location, then tracking program 115 proceeds to decision process 230.

In decision process 230, tracking program 115 determines whether to send a message based on the preset and customized rules. In some cases, a regular update is desired by the authority figure regarding the location of an individual. As such, based on the preset and customized rules tracking program 115 determines whether to send a message based on, for example, the time of day. In some embodiments, tracking program 115 determines whether to send a message based on the identification of an individual at a particular location, and in response to the preset and customized rules. In some embodiments, such rules indicate that a message is to be sent in response to the identification of the individual entering or leaving a particular location. For example, an individual is identified at an exit and then shortly after, the individual is identified at the perimeter of a particular property. As a result, tracking program 115 determines to send a message to an authority figure indicating that the individual has left the property, according to the preset and customized rules. As such, in certain embodiments, tracking program 115 is configured to extrapolate a probable location of an individual or, as in the previous example, where the individual is likely not located.

If tracking program 115 determines not to send a message based on the preset and customized rules, then tracking program 115 returns to process 210. If tracking program 115 determines to send a message in response to send a message based on the preset and customized rules, then tracking program 115 generates and sends such a message based on the preset and customized rules, in process 235. In some embodiments, the preset and customized rules indicate the schedule of the individual and if tracking program 115 is unable to identify that individual, then tracking program 115 determines that a message is to be sent. For example, if an individual is scheduled to arrive home by no later than eleven p.m., then tracking program 115 will send a message, according to the customized rules, to a phone number and email address of the authority figure if tracking program 115 does not identify the location of that individual as home by eleven p.m. In other embodiments, tracking program 115 is configured to predict an expected arrival or departure time based on factors such as modes of transportation (e.g., walking, biking, or public transportation), inclement weather, and traffic patterns. In such embodiments, tracking program 115 uses this information to predict how quickly an individual will be able to travel from one location to another and calculates an estimated arrival time based on that rate of travel. In another embodiment, tracking program 115 uses historical data, such as previous times and dates when an individual was identified at a location, to predict future instances of that individual being at that same location. In such embodiments, the historical data is included in one or both of user profiles 116 or data sources 117.

In this embodiment, as part of the determination of whether to send a message based on the preset and customized rules, tracking program 115 determines whether the preset and customized rules indicate that monitoring of the individual is to cease. For example, if a scheduled time period for monitoring the individual has passed. In continuation with the previous example regarding individual A, the preset and customized rules indicate that monitoring of the location of individual A is to cease once tracking program 115 has identified individual A as having exited the school bus, via analysis of the second segments of video footage from the bus. As such, once tracking program 115 has identified individual A as having exited the school bus, tracking program 115 logs the location of individual A as being "home" and ceases monitoring activity for that day. In some cases, tracking program 115 sends a report to the authority figure once monitoring has ceased. In some embodiments, such a report indicates the locations at which the individual was identified during the period of monitoring.

Figure 3:
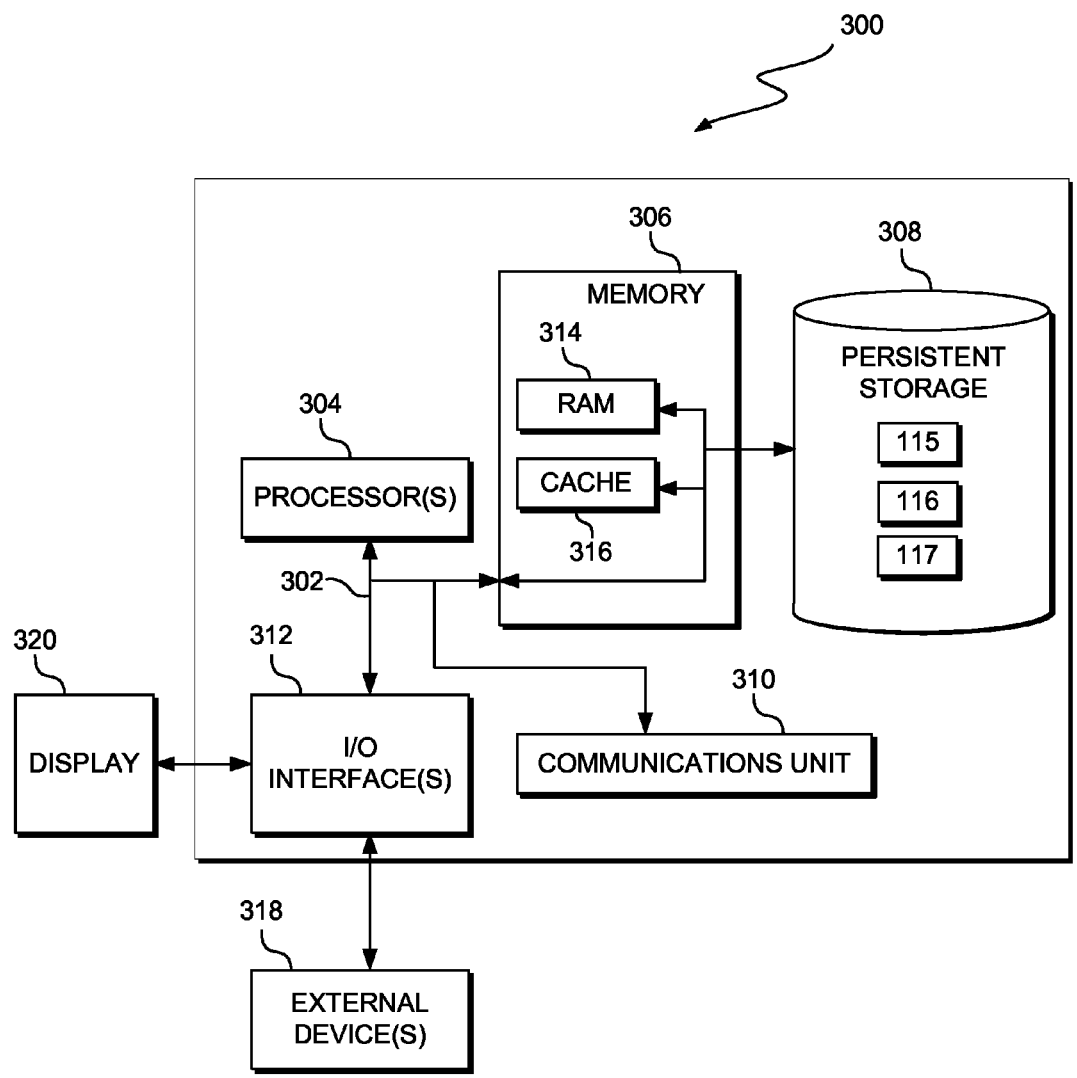
FIG. 3 depicts a block diagram of components of a computing device, a monitoring device, and the server computing device executing the tracking program, in accordance with an embodiment of the present invention.

FIG. 3 depicts a block diagram, 300, of respective components of server computing device 110, computing device 120 and monitoring devices 140, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Server computing device 110 and computing device 120 respectively include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Tracking program 115, user profiles 116 and data sources 117 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Tracking program 115, user profiles 116 and data sources 117 may be downloaded to persistent storage 308 through communications unit 310.

I/O interface(s) 312 allows for input and output of data with other devices that may be respectively connected to server computing device 110 and computing device 120. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., tracking program 115, user profiles 116 and data sources 117, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA)

may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for determining a location of an individual, the method comprising:
    receiving, by one or more processors, data from one or more devices that are configured to gather at least one image of an individual and at least one information that indicates the identity of the individual, wherein one or both of the at least one image and the at least one information include environmental data captured by the one or more devices that indicates a distinguishing characteristic of the environment of the individual;
    analyzing, by one or more processors, the at least one image of an individual and the at least one information to i) generate a first set of identifying characteristics of the individual, ii) determine a possible location associated with the environmental data;
    determining, by one or more processors, i) whether the first set of identifying characteristics of the individual matches a second set of identifying characteristics of that individual within a first threshold, wherein the second set of identifying characteristics of that individual are of record, and ii) a likelihood that the individual would be at the possible location;
    responsive to i) determination that the first set of identifying characteristics matches the second set of identifying characteristics within the first threshold and ii) the likelihood that the individual would be at the possible location is above a second threshold;
    providing, by the one or more processors, an incentive to the individual to provide an additional data based, at least in part, on the possible location; and
    responsive to a reception of the additional data, determining, by one or more processors, that the possible location of the individual indicates an actual location of the individual.

2. The method of claim 1, wherein the step of receiving, by one or more processors, data from one or more devices that are configured to gather at least one image of an individual and at least one information that indicates the identity of the individual further comprises:
    receiving, by one or more processors, data from at least one device configured to capture facial features of the individual; and
    receiving, by one or more processors, data from at least one device configured to capture biometric data to indicate the identity of that individual.

3. The method of claim 1, wherein the at least one information includes one or both of: a) a first sequence of characters that are entered by the individual into a device included in the one or more devices, and b) a second sequence of characters that are provided by an object in possession of the individual when the individual uses the device included in the one or more devices.

4. The method of claim 1, wherein the second set of identifying characteristics of the individual are included as part of a profile of an authority figure, wherein the profile of the authority figure indicates that the location of the individual is to be determined based, at least in part, on data from one or more devices, and wherein the profile includes a set of configurable rules that are to be applied when determining the location of the individual.

5. The method of claim 1, wherein, analyzing, by one or more processors, the at least one image of the individual and the at least one information to generate the first set of identifying characteristics of the individual further comprises:

using, by one or more processors, one or more programs that are configured for facial recognition to analyze the at least one image; and using, by one or more processors, one or more programs that are configured to analyze biometric data of the individual that is captured by the one or more devices.

6. The method of claim 4, the method further comprising:

generating, by one or more processors, a report that indicates one or more locations of the individual during a period of time; and responsive to a request for the report, sending, by one or more processors, the report to the authority figure.

7. The method of claim 1, the method further comprising:

determining, by one or more processors, the location of the individual based, at least in part, on a location that is derived from the analysis of the at least one image and the at least one information.

8. A computer program product for determining a location of an individual, the computer program product comprising:

a computer readable storage medium and program instructions stored on the computer readable storage medium, the program instructions comprising:

program instructions to receive data from one or more devices that are configured to gather at least one image of an individual and at least one information that indicates the identity of the individual, wherein one or both of the at least one image and the at least one information include environmental data captured by the one or more devices that indicates a-distinguishing characteristic of the environment of the individual;

program instructions to analyze the at least one image of an individual and the at least one information to generate a first set of identifying characteristics of the individual, ii) determine a possible location associated with the environmental data;

program instructions to determine whether the first set of identifying characteristics of the individual matches a second set of identifying characteristics of that individual within a first threshold, wherein the second set of identifying characteristics of that individual are of record, and ii) a likelihood that the individual would be at the possible location;

program instructions to respond to i) determination that the first set of identifying characteristics matches the second set of identifying characteristics within the first threshold and ii) the likelihood that the individual would be at the possible location is above a second threshold;

program instructions to provide an incentive to the individual to provide an additional data based, at least in part, on the possible location; and program instructions to respond to a reception of the additional data, by determining that the possible location of the individual indicates an actual location of the individual.

9. The computer program product of claim 8, wherein the step of receiving, by one or more processors, data from one or more devices that are configured to gather at least one image of an individual and at least one information that indicates the identity of the individual further comprises:

program instructions to receive data from at least one device configured to capture facial features of the individual; and program instructions to receive data from at least one device configured to capture biometric data to indicate the identity of that individual.

10. The computer program product of claim 8, wherein the at least one information includes one or both of: a) a first sequence of characters that are entered by the individual into a device included in the one or more devices, and b) a second sequence of characters that are provided by an object in possession of the individual when the individual uses the device included in the one or more devices.

11. The computer program product of claim 8, wherein the second set of identifying characteristics of the individual are included as part of a profile of an authority figure, wherein the profile of the authority figure indicates that the location of the individual is to be determined based, at least in part, on data from one or more devices, and wherein the profile includes a set of configurable rules that are to be applied when determining the location of the individual.

12. The computer program product of claim 8, wherein the program instructions to analyze the at least one image of an individual and the at least one information to generate a first set of identifying characteristics of the individual further comprises:

program instructions to using, by one or more processors, one or more programs that are configured for facial recognition to analyze the at least one image; and program instructions to using, by one or more processors, one or more programs that are configured to analyze biometric data of the individual that is captured by the one or more devices.

13. The computer program product of claim 11, the method further comprising:

program instructions to generate a report that indicates one or more locations of the individual during a period of time; and program instructions to respond to a request for the report by sending the report to the authority figure.

14. The computer program product of claim 8, the method further comprising:

program instructions to determine the location of the individual based, at least in part, on a location that is derived from the analysis of the at least one image and the at least one information.

15. A computer system for determining a location of an individual, the computer system comprising:

one or more computer processors;

one or more computer readable storage media;

program instructions stored on the computer readable storage media for execution by at least one of the one or more processors, the program instructions comprising:

program instructions to receive data from one or more devices that are configured to gather at least one image of an individual and at least one information that indicates the identity of the individual, wherein one or both of the at least one image and the at least one information include environmental data captured by the one or more devices that indicates a-distinguishing characteristic of the environment of the individual;

program instructions to analyze the at least one image of an individual and the at least one information to i) generate a first set of identifying characteristics of the individual, ii) determine a possible location associated with the environmental data;

program instructions to determine whether the first set of identifying characteristics of the individual matches a second set of identifying characteristics of that individual within a first threshold, wherein the second set of identifying characteristics of that individual are of record, and ii) a likelihood that the individual would be at the possible location;

program instructions to respond to i) determination that the first set of identifying characteristics matches the second set of identifying characteristics within the first threshold and ii) the likelihood that the individual would be at the possible location is above a second threshold;

program instructions to provide an incentive to the individual to provide an additional data based, at least in part, on the possible location; and program instructions to respond to a reception of the additional data, by determining that the possible location of the individual indicates an actual location of the individual.

16. The computer system of claim 15, wherein the step of receiving, by one or more processors, data from one or more devices that are configured to gather at least one image of an individual and at least one information that indicates the identity of the individual further comprises:

receiving, by one or more processors, data from at least one device configured to capture facial features of the individual; and receiving, by one or more processors, data from at least one device configured to capture biometric data to indicate the identity of that individual.

17. The computer system of claim 15, wherein the at least one information includes one or both of: a) a first sequence of characters that are entered by the individual into a device included in the one or more devices, and b) a second sequence of characters that are provided by an object in possession of the individual when the individual uses the device included in the one or more devices.

18. The computer system of claim 15, wherein the second set of identifying characteristics of the individual are included as part of a profile of an authority figure, wherein the profile of the authority figure indicates that the location of the individual is to be determined based, at least in part, on data from one or more devices, and wherein the profile includes a set of configurable rules that are to be applied when determining the location of the individual.

19. The computer system of claim 15, wherein the program instructions to analyze the at least one image of an individual and the at least one information to generate a first set of identifying characteristics of the individual further comprises:

program instructions to using, by one or more processors, one or more programs that are configured for facial recognition to analyze the at least one image; and program instructions to using, by one or more processors, one or more programs that are configured to analyze biometric data of the individual that is captured by the one or more devices.

20. The computer system of claim 18, the method further comprising:

program instructions to generate a report that indicates one or more locations of the individual during a period of time; and program instructions to respond to a request for the report by sending the report to the authority figure.

* * * * *